Aug. 21, 1951  W. A. STONE  2,564,772
CAGING AND CENTERING APPARATUS FOR GYROSCOPES
Filed June 28, 1948  3 Sheets-Sheet 1

Inventor
WAYNE A. STONE

George H. Fisher
Attorney

Aug. 21, 1951    W. A. STONE    2,564,772
CAGING AND CENTERING APPARATUS FOR GYROSCOPES
Filed June 28, 1948    3 Sheets-Sheet 2
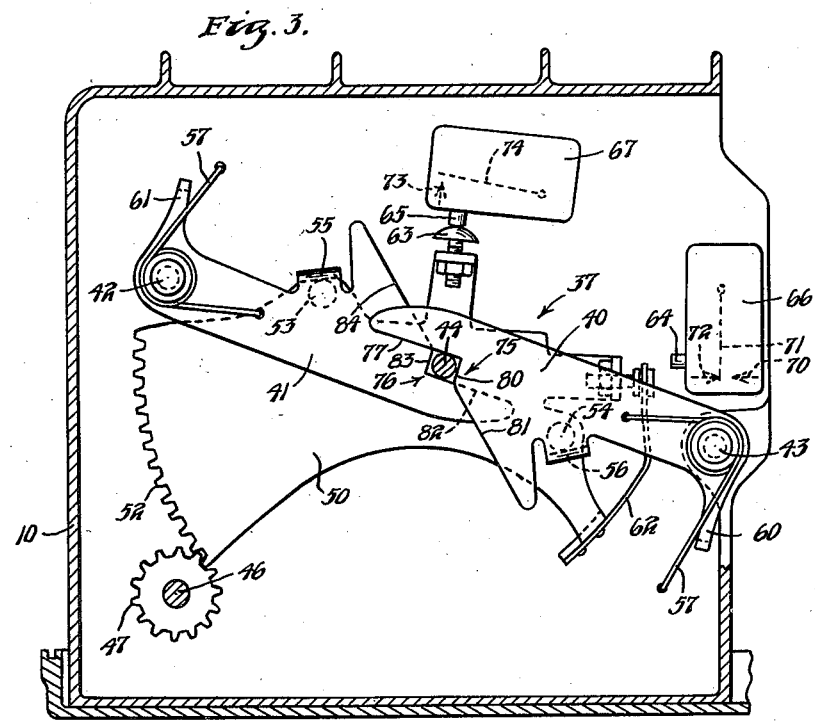
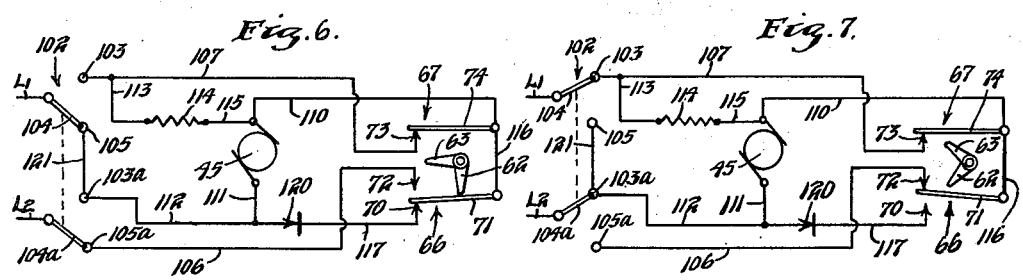
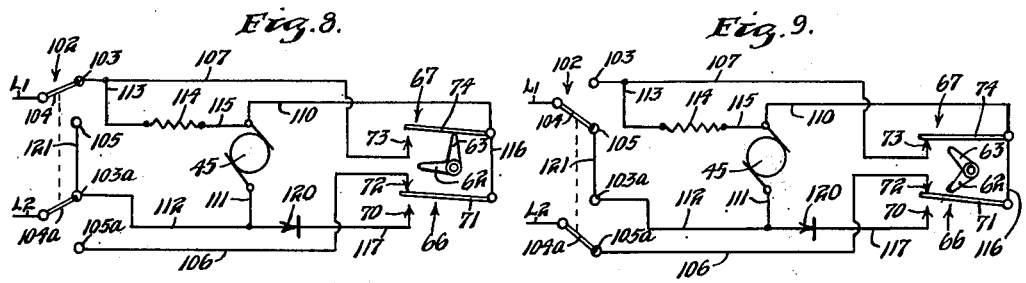
Inventor
WAYNE A. STONE
By
George H. Fisher
Attorney Aug. 21, 1951 W. A. STONE 2,564,772
CAGING AND CENTERING APPARATUS FOR GYROSCOPES
Filed June 28, 1948 3 Sheets-Sheet 3

Inventor
WAYNE A. STONE

George H. Fisher
Attorney

Patented Aug. 21, 1951

2,564,772

UNITED STATES PATENT OFFICE 2,564,772

CAGING AND CENTERING APPARATUS FOR GYROSCOPES

Wayne A. Stone, St. Louis Park, Minn., assignor to Minneapolis-Honeywell Regulator Company, Minneapolis, Minn., a corporation of Delaware Application June 28, 1948, Serial No. 35,600

14 Claims. (Cl. 74—5.1)

This invention relates to gyroscopes and more particularly to a means for caging and centralizing such instruments.

Caging and centralizing means on gyroscopes, particularly directional gyroscopes, are old in the art but these known methods have certain disadvantages, such as coning or the spiralling of the gyroscope as it is moved toward a normal position and severe shock, which introduce undesirable effects and errors into autopilot systems with which these devices are commonly used. This is particularly true when a directional gyroscope, such as the present embodiment, is used in an aircraft control system and is caged during turning of the aircraft.

It is therefore an object of the present invention to provide means for eliminating the coning effect of a gyroscope which occurs when the caging means does not in the initial stages of caging destroy gyroscopic rigidity.

It is further an object of the present invention to provide a simple and effective method of caging a gyroscope which does not immediately destroy gyroscopic rigidity and does not introduce severe shock to the gyroscope's associated system.

Another object of the present invention is to provide a caging means in which the caging arms have a pin receiving notch therein, such that the gyroscope is moved toward its normal position before gyroscopic rigidity is destroyed.

It is still further an object of this invention to provide a simple and effective means of rapidly caging and centralizing a gyroscopic instrument.

Figure 1:
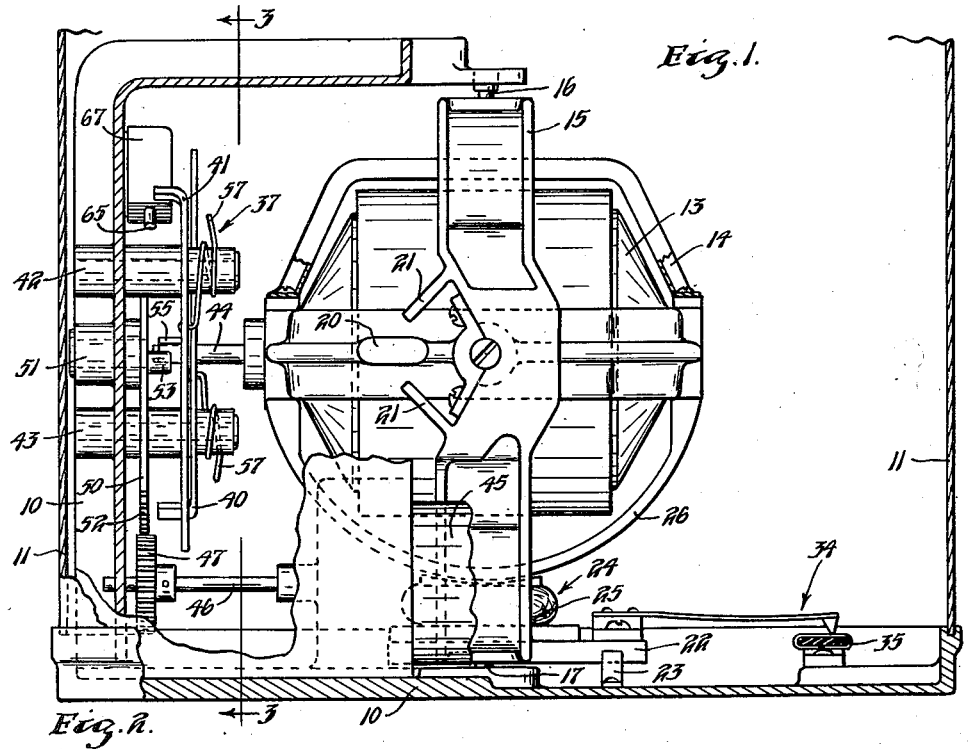
Figure 2:
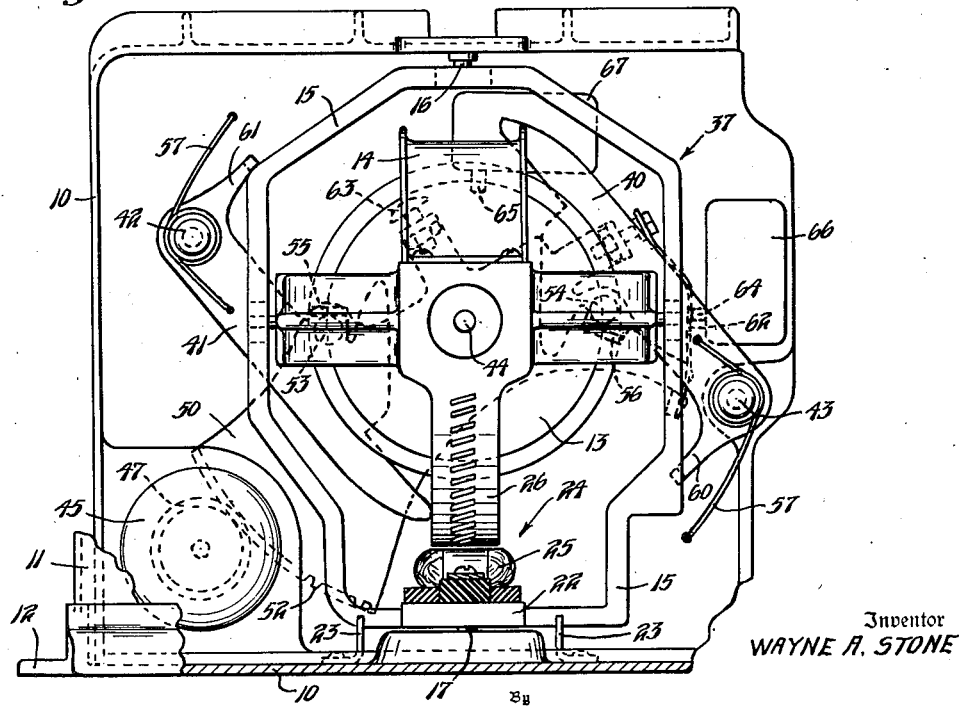
Figure 4:
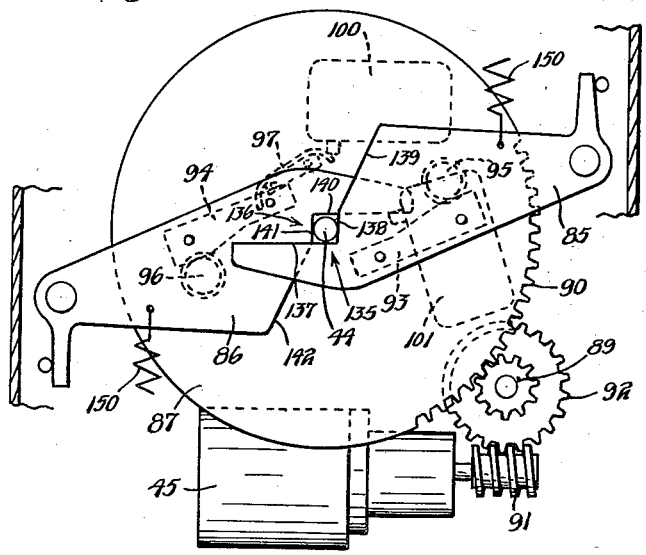
Figure 5:
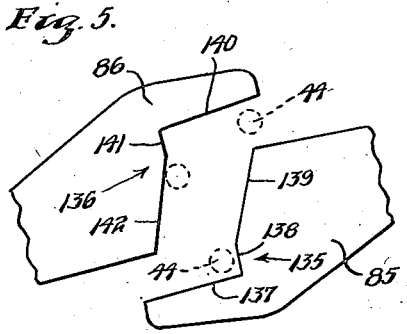

Other objects of this invention will become apparent from the following description and structural details when read in connection with the accompanying drawings, wherein:

Figure 1 is a side elevation view of the gyroscope with a portion of the base mounting structure and cover broken away to disclose the caging mechanism of the gyroscope, Figure 2 is an end elevation view of the gyroscope of Figure 1 with the gravity sensitive control device and an erection motor removed to facilitate the disclosure of the caging mechanism, Figure 3 is a vertical section with the gyroscope taken along the lines 3—3 of Figure 1 showing the caging arms engaging the gyroscope in the caged position of the gyroscope, Figure 4 is a schematic view of another embodiment of the gearing mechanism driving the arms of the caging mechanism of the gyroscope, Figure 5 is a schematic view of the caging arms with notches therein shown with the gyroscope pin in a number of positions, Figures 6, 7, 8 and 9 are schematic circuit diagrams of the circuit controlling the energization of the caging motor, in which, Figure 6 shows a manual control switch in the uncaged position and the motor deenergized, Figure 7 shows the manual control switch in the caged position and the motor energized, Figure 8 shows the manual control switch in the caged position and the motor energized to reduced power when the gyroscope is in the caged position, and Figure 9 shows the manual control switch in the uncaged position and the motor energized as the caging arms are moved to an uncaged position.

In Figures 1 and 2 is shown my novel directional gyroscope which is universally mounted and positioned within a housing or base member 10. A cover 11, partially shown in Figure 1, fits down over the gyroscope and fastens to housing 10. The gyroscope may be mounted on any desired surface or object, such as an aircraft, by means of flanges 12 projecting from the housing 10. It comprises a rotor 13 mounted for rotation in a mounting ring 14, which is similarly pivoted for rotation in a Cardan ring 15. The Cardan ring 15 is pivoted at bearing points 16 and 17 of housing 10 to provide the well-known universal mounting of the gyroscope. Rotor 13 is actuated by any type of spinning means, such as electric motor or air motor, and for simplicity of disclosure herein, the energizing source and connections to the rotor spinning means are omitted here. Mounting ring 14 which pivots rotor 13 for rotation therein and which is similarly pivoted to Cardan ring 15 has a limited angle of rotation provided by stop lug 20 mounted thereon adapted to engage stops 21 on Cardan ring 15. Similarly, Cardan ring 15 has a limited angle of rotation provided by the engagement of arm of projection 22 of Cardan ring 15 with fixed stops 23 positioned on housing 10. Thus, limited displacement is provided for this restricted directional gyroscope about the vertical and one horizontal axis.

The gyroscope also includes a precession motor 24, the field structure 25 of which is positioned on Cardan ring 15 at the projection or arm 22 thereof. The field structure 25 cooperates with a squirrel cage 26 of precession motor 24 mounted on mounting ring 14. Precession motor 24 may also be known as the slaving motor operating to maintain the spin axis of the rotor along a particular heading. The precession motor usually is used to coordinate the position of the gyroscope with a controlling device such as a magnetic compass and thereby correct errors in azimuth. Its energizing circuit and connections are omitted here for simplicity. The gyroscope further includes a spin axis erection motor omitted in the drawing for simplicity of disclosure, which is adapted to maintain the spin axis of the gyroscope horizontal with respect to gravitational effect. Its squirrel cage rotor section is usually mounted on Cardan ring 15 and the cooperating field structure is usually positioned on housing or base member 10. The energization of the spin axis erection motor is controlled through the operation of a gravity sensitive control device such as a mercury switch also omitted from the drawings, which is usually mounted on the mounting ring 14 of the gyroscope or mounted to be operated by displacement of said ring.

As is customary when a directional gyroscope is used in an aircraft control system, the displacement of the gyroscope in a horizontal plane indicating change in heading or direction of the mounting structure in that plane is utilized to provide a proportionate signal to the control system. The present gyroscope is provided with a potentiometer assembly 34, the winding 35 of which is positioned on housing 10 and the wiper of which is mounted on the Cardan ring 15 as an extension of the Cardan arm or projection 22. Such a potentiometer assembly would be energized from an external circuit and a variable signal obtained from it would similarly be impressed on an external circuit. For this reason connections to the potentiometer assembly are omitted here.

The caging and centering mechanism 37 of the gyroscope includes a pair of caging arms 40, 41 pivoted on a pair of projecting pins 42, 43 which are attached to and form a part of housing 10. Caging arms 40, 41 are adapted to engage pin 44 fixed to and extending from mounting ring 14 concentric with the axis of rotor 13. Operatively connected to and driving caging arms 40, 41 is motor 45 which is mounted on housing 10. Motor 45 in the present embodiment is a permanent magnet field type motor but it should be noted that any type of electric motor or motivating force can be used to perform this operation. Motor 45 includes a shaft 46 and driving gear 47 attached to the extremity thereof which cooperates with a geared driving plate 50 pivoted approximately near the center of the upstanding portion of housing 10 on a projecting or center pin 51 fixed thereto. Pin 51 of the housing 10 is simlarly concentric with the extension of axis of rotor 13 in its normal horizontal position. A portion of the periphery 52 of driving plate 50 is geared so that it cooperates with the gear 47 of motor shaft 46. Driving plate 50 also carriers rollers or cams 53, 54 (best shown in Figure 3) which engage cam followers 55, 56 attached as an integral part to arms 41 and 40 respectively. As driving plate 50 is pivoted about its mounting pivot pin 51, its rollers or cams 53, 54 engage the cam followers 55, 56 of arms 41, and 40 respectively pivoting said arms above their respective mounting points 42, 43. Cams 53, 54 are so positioned on opposite sides of the center or pivot 51 of plate 50 that as cams 53, 54 move clockwise with driving plate 50, the cam followers 55, 56 and their respective arms move counter-clockwise about their respective pivot points. This movement of caging arms 40, 41 is in the direction of abutting or closed position to effect caging of the gyroscope. The caging arms are, however, at different distances from the upstanding portion of housing 10 for this reason the tips of the said arms overlap but do not contact one another.

Caging arms 40, 41 have springs 57 attached thereto which are anchored at one end to base member 10 biasing said arms in such a manner that the cam followers 55, 56 are biased into engagement with cams 53, 54 respectively. Projecting from the pivoted extremities of caging arms 40, 41 are stop lugs 60, 61 respectively which lugs engage portions of the upstanding portion of housing 10 in uncaged position to limit movement of the arms.

Driving plate 50 also carries additional cam surfaces or cams 62, 63 which are positioned to contact the button 64, 65 of limit switches 66, 67, respectively. The limit switches 66, 67 are mounted on the upstanding portion of housing 10. Switch 66 which is contacted by cam surface 62 is a double throw single pole switch such that its normally open contacts 70, 71, as seen in Figures 6–9, are open when cam surface 62 has not engaged the switch button or toggle 64, that is in the caged position. The normally closed contacts 71, 72 of switch 66 are not made upon engagement of cam surface 62 with switch button or toggle 64 in the uncaged position. Switch 67 is a normally closed switch with a pair of contacts 73, 74 made in the uncaged position of the gyroscope when cam surface 63 is not in contact with switch button or toggle 65. The cam surfaces 62, 63 are so shaped and positioned on drive plate 50 that they engage and maintain contact with the switch buttons 64, 65 respectively for different periods of time. These switches control the energizing circuits of motor 45 in the manner which will become evident as this disclosure proceeds. As shown in Figures 2 and 3, the cam surfaces 62, 63 have an adjustment feature so as to vary the period during which each contacts its respective switch toggle.

Caging arms 40, 41 each have symmetrical notches 75, 76 respectively in the unpivoted or free extremity thereof adapted to engage pin 44 of the gyroscope which is fixed to mounting ring 14. These notches in the arms 40, 41 are each three sided. Notch 75 has one surface 77 or face extending longitudinal of arm 40, a shorter transverse face or surface 80 extending normal to the longitudinal surface 77 and a third face or surface 81 extending oblique to the short normal surface 80 and making an oblique angle with the longitudinal surface 77. Similarly, caging arm 41 has included in notch 76 a longitudinal extending surface 82, a shorter transverse surface 83 extending normal to the longitudinal surface 82, and a third surface 84 extending obliquely to the short normal surface 83 making an oblique angle with surface 82. The longer longitudinal surfaces 77 and 82 and obliquely position surfaces 81, 84 of notches 75, 76 respectively are adapted to cause precession of the gyroscope upon engagement with the pin 44 of the gyroscope. The shorter normal surfaces 80, 83 of notches 75, 76 respectively are adapted to be engaged by pin 44 of the gyroscope as the gyroscope is precessing away from the force of engagement of the larger precessing surfaces with the pin 44. This engagement of the pin with the shorter normal surfaces 80, 83 causes destruction of the rigidity of the gyroscope as will be later described. Notches 75, 76 or arms 40, 41 are similar such that the respective surfaces are parallel to one another when the arms are in the caged position to form a square opening, as seen in Figure 3, wherein pin 44 is positioned and held as the gyroscope is caged.

The caging and centering mechanism 37 of the gyroscope is energized through the circuits shown in Figures 6, 7, 8 and 9. The energization of these circuits is controlled by a manually (or automatic, if the associated system so provides) operated control switch 102 which has two sets of double pole double throw contacts. Switch 102, omitted in Figures 1–5, is usually mounted on a remotely positioned control panel and has two pairs of stationary contacts 103, 105 and 103a and 105a adapted to be contacted by movable contacts 104, 104a respectively. Figure 6 shows a schematic circuit diagram of the controlling circuit of motor 45 wherein the manually operable control switch 102 is an uncaged position such that movable contact 104 contacts fixed contact 105 and movable contact 104a contacts fixed contact 105a. The limit switches 66, 67 are schematically shown to correspond to the actual positioning of their respective contact elements caused by the positioning of the cooperating cams as shown in Figure 2. Thus the contacts of limit switch 67 are closed, since it is a normally closed limit switch and cam 63 has not engaged toggle 65. Similarly, limit switch 66 is in its normally operative position with its normally closed contacts open and normally open contacts closed since cam 62 is in contact with toggle or switch button 64. Motor 45 is deenergized since the circuit from L2 which is completed to contacts 104a, 105a and conductor 106 is not completed through the normally closed contacts 71, 72 of limit switch 66. This circuit discloses the positioning of the manual control switch and the limit switches when the gyroscope is uncaged and its manually controlled switch 102 is so positioned. Figure 7 shows the manually controlled caging switch 102 moved to a caged position wherein contacts 104, 103 and 104a, 103a are made and limit switch 66 has moved to a normally inoperative position making contacts 71, 72 and breaking contacts 70, 71. This latter switch is not actuated, however, until the plate 50 has moved over a partial extent of its travel toward caged position as will be later noted. With the engagement of contacts of switch 102 an energizing circuit is provided for motor 45 as follows: L1, movable contact 104 to stationary contact 103 of switch 102, conductor 107, stationary contact 73 to movable contact 74 of limit switch 67, conductor 110 to the armature of motor 45, conductor 111 to conductor 112, and stationary contact 103a to movable contact 104a of switch 102, to line L2. Immediately upon engagement of the contacts of switch 102 in the caged position, there will be formed other possible circuits for current flow from L1 to L2 which are not effective for the reasons named below. One such possible circuit occurs through conductor 113 which is connected to load resistor 114 and conductor 107, resistor 114 is in turn being connected to the armature of motor 45 by a conductor 115. This path is not effective in energizing motor 45 inasmuch as the connections from conductor 107 through limit switch 67 to conductor 110 provide a shunt circuit around this load resistor. Another circuit appears possible when the movable contact 71 of switch 66 has not left the position of contact with fixed contact 70 to make contact with fixed contact 72. A circuit from L1 through contacts 104, 103 of switch 102 to conductor 107, and through limit switch 67 to conductor 116, through limit switch 66, through contacts 70, 71 of limit switch 66 to conductor 117, rectifier 120 to conductor 112, and through 104a, 103a to L2 is prohibited by virtue of the positioning of rectifier 120 restricting the direct current flow in this direction. Motor 45 energized through the circuit first described drives plate 50 in a clockwise direction as viewed in Figures 2 and 3 moving caging arms 40, 41 to a closed position. Operation of the limit switch 66 is not effected immediately upon operation of manual switch 102 and energization of motor 45, but rather occurs near completion of travel of caging arms 40, 41. Motor 45 attains sufficient momentum during operation to carry the caging arms to their extreme limits after the operation of the limit switches 66 and 67 reducing or disconnecting the power applied to the motor depending upon which direction the caging arms are moving. Cam surfaces 62 and 63 are so positioned that cam 63 will engage switch toggle 65 shortly after cam 62 disengages switch toggle 64.

Figure 8 shows the energizing circuit of motor 45 when the caging arms 40, 41 are at or near caged position. Manually controlled switch 102 remains in the caged position with contacts 104, 103 and 104a, 103a closed. As caged position is approached limit switch 67 is opened by the operation of cam 63 engaging toggle 65, the operation of limit switch 66 having occurred at an earlier stage of travel of plate 50 and remaining unchanged as the caging operation nears completion. Thus the energizing circuit of Figure 7 for motor 45 from L1 through contacts 103, 104 of switch 102, conductor 107, contacts 73—74 of switch 67, conductor 110, armature of motor 45, conductor 111, conductor 112, contacts 103a to 104a of switch 102 to L2 is broken by the movement of switch 67 to operative (open) position. Motor 45 is now energized through a circuit including load resistor 114 which effects a reduction of current flow through the motor armature and therefore its power output. The energizing circuit for a caged position is as follows: L1 to contacts 104, 103 of switch 102, conductor 113, resistor 114, conductor 115, armature of motor 45, conductor 111, conductor 112, and contacts 103a, 104a of switch 102 to line 2.

Figure 9 shows the operation of and energization in the caging mechanism as manually controlled switch 102 is moved to the uncaged position establishing contact through contacts 104, 105 and 104a, 105a. Figure 9 further shows the engagement of the contacts of normally closed limit switch 67, but this does not occur until after the plate 50 has been rotated a given distance toward uncaged position, as will be later noted. Motor 45 is energized under this positioning of the manual control switch in the following manner: L1, contacts 104, 105 of switch 102, conductor 121, contact 103a of switch 102, conductor 112, conductor 111, armature of motor 46, conductor 110, conductor 116, contacts 71, 72 of switch 66, and conductor 106 through contacts 104a, 105a of switch 102 to L2. Movement of the motor and cam 63 on drive plate 50 is in the opposite direction to that established by engagement of contacts 73, 74 of switch 67 for the caging operation as recited above. It will be seen in this circuit just traced that the direction of current flow through the armature is reversed; thereby reversing the direction of rotation of motor 45. During movement of the caging arms 40, 41 and the drive plate 50 into the full uncaged position, the limit switches again resume the position shown in Figure 6 switch 67 being first actuated, as shown in Figure 9, followed by the operation of switch 66 to the operative position. Motor 45 is deenergized by the operation of switch 66 but the momentum of motor is effective to complete the uncaging operation. The operation of switch 67 has no effect on the energizing circuit of motor 45 during the uncaging operation with switch 102 in the uncaged position. When both of the switches 66 and 67 have operated in the uncaging operation the circuit of Figure 6 occurs and a dynamic braking circuit is set up through the motor armature and the limit switches in this position to reduce the speed at which the caging arms reach the stops at the uncaged position. This circuit is as follows: Armature of motor 45, conductor 111, rectifier 120, conductor 117, contacts 70—71, conductor 116, and conductor 110 to armature of motor 45.

In operation, the gyroscope is largely conventional with the exception of the operation of the caging and centering mechanism 37. A directional gyroscope, as herein disclosed, for operating in connection with an aircraft control system is usually caged when the object which the system is controlling is operated to change heading. Similarly, a directional gyroscope, when used with a compass, may be caged during the change of direction of heading. As shown in Figure 7, the caging operation for the present gyroscope is initiated by manually operating control switch 102 to the caged position energizing caging motor 45. As caging arms 40, 41 are moved toward this caged position one or the other or both will engage contact pin 44 of mounting ring 14. The gyroscope when operating is energized such that the rotor and its spinning means are rotating at an operating speed and will resist the force applied by the caging arms 40 or 41 thereby stopping movement of the drive plate 50 and caging arms 40, 41 as well as motor 45. This resistivity to a force applied to the gyroscope is known as gyroscopic rigidity. As force is applied from the caging arms, the gyroscope will precess in a well-known manner in a direction normal to the applied force, which direction is dependent upon the direction of rotation of the rotor 13. In Figures 1, 2, 3, the direction of rotation of the rotor is counterclockwise as viewed from the end of the rotor shaft where pin 44 is located. Pin 44 is contacted by one of the other of the surfaces 77, 81, 82, or 84 of notches 75 or 76 of arms 40 or 41 and the gyroscope and pin will precess in a clockwise direction as viewed from the same point as the rotation of the rotor was described. Such precession will continue as long as one of the arms 40, 41 is engaging pin 44 and until one or the other of the short normal surfaces 80, 83 of notches 75, 76 in arms 40, 41 respectively, described above, is engaged at which time the rigidity of the gyroscope will be destroyed and the caging operation is completed without the counteracting effect of this force. Because such operation is difficult to visualize from Figures 1, 2 and 3, it will be described more fully as applied to the modification of Figure 4.

Figure 4 shows a modification of the gearing for the caging and centering of the gyroscope. In this modification a pair of caging arms 85, 86 have notches 135, 136 respectively which notches are reversed from those of arms 40, 41. Notch 135 has a longitudinal surface 137, a shorter transverse surface 138 and an oblique surface 139 which correspond to similar surfaces in the notches of arms 40, 41 of Figures 1, 2 and 3. Similarly notch 136 has a longitudinal surface 140, a shorter transverse surface 141, and an oblique surface 142. The angles formed between the longitudinal surfaces and the oblique surfaces in the notches of the caging arms for the preferred and modified embodiments of this invention are slightly different but it should be noted that this angle may be varied between 90 and 180 degrees without changing the operation of the caging mechanism; such variation resulting only in a variation of the time required to destroy gyroscopic rigidity should an oblique surface of a caging be first engaged by the caging pin 44.

The caging arms 85, 86 are driven through a circular driving plate 87 which carries pivoted cam followers 95, 96 respectively adapted to engage cam surfaces 93, 94 respectively mounted on the caging arms. Biasing springs indicated at 150 bias the arms such that engagement is maintained between the cams and cam followers. Drive plate 87 has gear teeth 90 along a limited extent of its periphery which teeth engage a pinion 89 driven by a gear 92 which in turn meshes with and is driven by a worm gear 91 mounted on the shaft of motor 45. Operation of motor 45 in either direction causes similar rotation of plate 87 but with this arrangement of gearing and connection to plate 87, the motor is effective to drivingly operate arms 85, 87 in the uncaged direction since rotation of plate 87 in the opposite direction or toward caged position merely moves the cam followers 95, 96 away from the cams 93, 94 and it is the force of the spring 150 holding these elements in operative relationship which actually affects the movement of the caging arms in this direction.

The electrical circuit for this modification is the same as that described for the preferred embodiment of Figures 1, 2 and 3 but this modification requires a normally closed circuit switch 100 to correspond with switch 67 and a double pole single throw switch 101 similar to switch 66. A single switch engaging cam 97 is used to engage both of the limit switches 100 and 101, the former being engaged nearest the caged position and the latter engaged nearest the uncaged position.

The operation of this modification is similar to that of the preferred embodiment and hence that portion of it relating to the electrical circuit and the energization of the motor 45 is omitted here. The effect of engagement of the caging arms with pin 44 at other than the caged position however, is described below with respect to Figure 5. In Figure 5 the direction of rotation of the rotor is clockwise as viewed from the end of the rotor shaft where pin 44 is located. The pin 44 may be contacted by one of the other of the surfaces 137, 139 or 140, 142 of notches 135, 136 in arms 85, 86 of Figure 5, and the gyroscope and the pin will precess in a counterclockwise direction as viewed in the plane of the drawing causing pin 44 to move therewith. As noted above, caging arms 85, 86 of Figure 4 are oppositely notched and the oblique faces oppositely sloped from those disclosed in Figures 1, 2 and 3. Should the longitudinal surfaces 137, 140 of arms 85, 86 be contacted by the pin 44, the pin by precession of the gyroscope will be moved along the longitudinal surface toward the center of the notch to engage the shorter normal surface 138, 141 of the notch 135 or 136 in the caging arms. In this position the gyroscopic pin is locked by the surface normal to the direction of precession and the rigidity of the gyroscope is destroyed, that is, the gyroscope no longer resists the applied force and no longer reacts as a high speed rotating body but rather as an inert mass. Similarly if one or the other of the oblique surfaces 139, 142 of notches 135, 136 in caging arms 85, 86 are contacted, pin 44 will move counterclockwise along the surface thereof, that is, will move up or down along said surfaces as seen in Figure 5 away from the respective notches until there is no longer further surface supplying a force to it since it is no longer engaging said surface. It should be remembered that the gyroscope pin through the rigidity of the gyroscope structure is resisting the force applied normal to its direction of movement of the pin along the faces of the notches in the caging arms 85, 86. At the point when pin 44 is no longer in contact with the surfaces of the notches of the caging arms, the arms 85, 86 encountering no force resisting their movement will be driven toward the caging position again and will continue such movement toward caged position until pin 44 is again engaged or contacted by the longitudinal surface of the opposite notch in the caging arms from that notch containing the oblique surface previously engaged. At this instance the gyroscope will again begin to precess in a direction normal to the applied force and counterclockwise along the surface of the longitudinal side of the notch toward the center of the notch and the short normal or transverse surface in the caging arm then engaged. Such precession will continue until the pin moves into engagement with the short normal surface of the notch, at which time gyroscopic rigidity is again destroyed. Once gyroscopic rigidity is destroyed, the gyroscope no longer resists the applied force of caging arms 85, 86 and consequently arms 85, 86 move pin and gyroscope toward the fully caged position corresponding to the normal horizontal position of the gyroscope rotor or axis of the rotor. Near this position, the limit switches are so contacted, as described above, that motor 45 is energized under reduced power so that a reduced torque is applied to the caging arm maintaining said arms in the caged position and resisting movement to the gyroscope therefrom.

In uncaging the gyroscope, the manual control switch 102 is moved to the uncaged position and motor 45 is energized at full power to rotate in the opposite direction to that of the caging operation until the limit switches are again operated at which time momentum of the motor will complete the uncaging operation. Caging arms 85, 86 move outwardly away from engagement of pin 44 and come to rest in the uncaged position beyond the restricted limits of the gyroscope, as described above, such that pin 44 cannot engage arms 85, 86 regardless of gyroscope displacement. At this point, the caging arms reach the position where the stop lugs engage similar stop receiving portions in the housing 10 and limit switches are so positioned that motor 45 is deenergized.

Changes may be made in the structural details employed in caging mechanism disclosed herein without departing from the scope of this invention. In this respect the caging motor having a directional field winding may be similarly employed and such change merely requires simplification of the contacts in the manually controlled switch.

In considering this invention, it should be kept in mind that the present disclosure is intended to be illustrative only and that the scope of the invention is to be determined only by the appended claims.

I claim:

1. In a caging and centralizing device for a universally mounted gyroscope, the combination with the gyroscope, of a pin projecting therefrom, a pair of caging arms each mounted to be pivoted around the gyroscope and having a notch in the unpivoted extremity whose sides are perpendicular to one another, caging motor means operatively connected to said arms for moving the same simultaneously toward the normal horizontal position of said gyroscope to engage said pin, and means controlling said caging motor means, at least one of said arms engaging said pin to cause precession of said gyroscope from one of said sides of said notch to a side normal to that first engaged such that gyroscopic rigidity is destroyed.

2. In a caging and centralizing device for universally mounted gyroscopes, the combination with the gyroscope and its mounting casing, of a pin projecting from the gyroscope, a plurality of caging arms each pivoted at one extremity to said gyroscope casing and having a notch in the unpivoted extremity the sides of which are approximately perpendicular to one another, motor means operatively connected to said caging arms for simultaneously moving the same to a position approximately tangent to the normal horizontal position of said gyroscope, spring means associated with said caging arms biasing the same against the action of the motor means, and control means for operating said motor means.

3. In a caging and centralizing device for universally mounted gyroscopes, the combination with the gyroscope and mounting casing, of a pin projecting from the gyroscope, a plurality of caging arms each pivoted at one extremity from the casing of said gyroscope and having a notch in the unpivoted extremity with a plurality of sides two sides of which are perpendicular to one another, motor means operatively connected to said caging arms for simultaneously moving the same, and spring means associated with said caging arms for biasing the same against movement of said motor means, one said perpendicular sides of said notches in said caging arms being adapted to destroy rigidity of said gyroscope when engaged by said gyroscope pin.

4. In a directional gyroscope, in combination with a rotor, and spinning means therefor, a universal mounting structure for said rotor, a pin projecting from said universal structure, casing means for supporting said universally mounted rotor, a pair of caging arms each pivoted at one extremity on said casing means and simultaneously actuated by a motor means, said caging arms having notches in the unpivoted extremities which enclose said pin of said universal structure in a caged position of said gyroscope, said notches having a surface therein adapted to engage said pin and destroy rigidity of said gyroscope as said arms are moved to said caged position.

5. In a caging and centralizing device for a universally mounted gyroscope, the combination with the gyroscope of a pin projecting therefrom, a pair of caging arms each mounted to be pivoted around said gyroscope and having a notch at the unpivoted extremity whose sides are perpendicular to one another, caging motor means operatively connected to said arms for moving the same simultaneously toward the normal horizontal position of said gyroscope to engage said pin, and means controlling said caging motor means, said notches in said caging arms forming a rectangle to encircle said pin in the caged position of said gyroscope.

6. In a caging and centralizing device for a universally mounted gyroscope, the combination with the gyroscope and its mounting casing, of a pin projecting from the gyroscope, a pair of caging arms each pivoted about different points of said casing and having a notch in the unpivoted extremity of said arms, and motor means for moving said arms simultaneously to engage said pin, said notches in said arms encircling and caging said pin of said gyroscope in its normal horizontal position when said arms are positioned by said motor means in a predetermined direction to the extent of their movement and having a surface therein adapted to engage said pin and destroy rigidity of said gyroscope as said arms are moved to said extent of their movement.

7. In a caging and centralizing device for a universally mounted gyroscope, the combination with the gyroscope and its mounting casing, of a pin projecting from the gyroscope, a pair of caging arms each pivoted about different points of said casing and having a notch in the unpivoted extremity of said arms, motor means for moving said arms simultaneously to engage said pin, said notches in said arms encircling and caging said pin of said gyroscope in its normal horizontal position when said arms are positioned by said motor means in a predetermined direction to the extent of their movement, a surface in each of said notches either one of which is adapted to engage said pin and destroy rigidity of said gyroscope as said arms are moved to said extent of movement, spring means for moving said arms in the opposite direction from said pin encircling position, and control means for controlling the operation of said motor means.

8. In a caging and centralizing device for universally mounted gyroscope, the combination with the gyroscope and its mounting casing, of a pin projecting from the gyroscope, a pair of caging arms each pivoted about different points on said casing and having a three faced notch at its unpivoted extremity two faces of which are perpendicular with one another, motor means for moving said arm simultaneously to engage said pin, the perpendicular faces of said notches in said arms encircling and caging said pin of said gyroscope when said arms are moved to said caged position thereof.

9. In a caging and centralizing device for universally mounted gyroscopes, the combination with the gyroscope and its mounting casing of a pin projected from the gyroscope, a pair of caging arms each pivoted about different points on said casing and having a notch with a plurality of faces located at the unpivoted extremity of said arms, motor means for moving said arms simultaneously to engage said pin, one of said faces adapted to destroy the rigidity of the gyroscope when contacted by said pin, and the remaining faces of said notch adapted to provide for precessing said gyroscope for centering the same.

10. In a caging and centralizing device for a universally mounted gyroscope, the combination with the gyroscope, of a pin projected therefrom, a pair of caging arms each mounted to be pivoted around the gyroscope and having a notch at the unpivoted extremities thereof, said notches having two extended obliquely related surfaces with a shorter surface normal to one of the obliquely related surfaces positioned therebetween, caging motor means operatively connected to said arms for moving the same simultaneously toward the normal horizontal position of the gyroscope to engage said pin, said obliquely related surfaces of said notch when engaged by said pin causing precession of said gyroscope, said shorter surface of said notch in said caging arms when engaged by said pin causing destruction of said gyroscopic rigidity of said gyroscope, and means controlling said caging motor means.

11. In a caging and centralizing device for a universally mounted gyroscope, the combination with the gyroscope of a pin projecting therefrom, a pair of caging arms each mounted to be pivoted around the gyroscope and having surfaces thereon perpendicular to one another, caging motor means operatively connected to said arms for moving the same simultaneously toward a normal horizontal position of said gyroscope to engage said pin, and means controlilng said caging motor means, at least one of said arms engaging said pin to cause precession of said gyroscope from one of said surfaces on said arms to the surface normal to that first engaged such that gyroscopic rigidity is destroyed.

12. In a caging and centralizing device for universally mounted gyroscopes, the combination with the gyroscope and a mounting casing, of a pin projecting from the gyroscope, a plurality of caging arms each pivoted at one extremity from the casing of said gyroscope and having a plurality of surfaces thereon two surfaces of which are perpendicular to one another, motor means operatively connected to said caging arms for simultaneously moving the same, and spring means associated with said caging arms for biasing the same against movement of said motor means, one of said perpendicular surfaces of said caging arms being adapted to destroy the rigidity of the gyroscope when engaged by said gyroscope.

13. In a caging and centralizing device for universally mounted gyroscopes, the combination with the gyroscope and its mounting casing, of a pin projecting from the gyroscope, a pair of caging arms each pivoted at different points on said casing and having three surfaces at its unpivoted extremity two of which are perpendicular to one another, motor means for moving said arms simultaneously to engage said pin, said perpendicular surfaces of said arms adapted to encircle and cage said pin of said gyroscope when said arms have moved to caged position.

14. In a caging and centralizing device for universally mounted gyroscopes, the combination with the gyroscope and its mounting casing of a pin projecting from the gyroscope, a pair of caging arms each pivoted about different points on said casing and having a plurality of surfaces located at the unpivoted extremity of said arms, motor means moving said arms simultaneously to engage said pin, one of said surfaces adapted to destroy rigidity of the gyroscope when contacted by said pin, the remaining surfaces of said arms adapted to provide for precession of said gyroscope for centering the same.

WAYNE A. STONE.

REFERENCES CITED

The following references are of record in the file of this patent:

UNITED STATES PATENTS

| Number | Name | Date |
|---|---|---|
| 1,451,928 | Tanner | April 17, 1923 |
| 1,918,082 | Carlson | July 11, 1933 |
| 2,280,116 | Carlson | April 21, 1942 |
| 2,393,124 | Smith | Jan. 15, 1946 |

FOREIGN PATENTS

| Number | Country | Date |
|---|---|---|
| 562,688 | Great Britain | July 12, 1944 |